(12) United States Patent  
Cho et al.

(10) Patent No.: US 10,163,191 B2
(45) Date of Patent: Dec. 25, 2018

(54) METHOD OF SCALING UP IMAGE (71) Applicant: NOVATEK Microelectronics Corp., Hsin-Chu (TW)

(72) Inventors: Sheng-Tien Cho, Hsinchu (TW); Chien-Chou Hung, Hsinchu (TW)

(73) Assignee: NOVATEK Microelectronics Corp., Hsin-Chu (TW)

( * ) Notice: Subject to any disclaimer, the term of this patent is extended or adjusted under 35 U.S.C. 154(b) by 331 days.

(21) Appl. No.: 14/666,327

(22) Filed: Mar. 24, 2015

(65) Prior Publication Data

US 2016/0284057 A1 Sep. 29, 2016

(51) Int. Cl.
| | |
|---|---|
| G06T 3/40 | (2006.01) |
| G06T 7/13 | (2017.01) |
| G06T 7/10 | (2017.01) |
| H04N 1/409 | (2006.01) |
| H04N 1/58 | (2006.01) |
| H04N 7/01 | (2006.01) |

(52) U.S. Cl.
CPC ............ G06T 3/4007 (2013.01); G06T 3/403 (2013.01); G06T 7/10 (2017.01); G06T 7/13 (2017.01); H04N 1/409 (2013.01); H04N 1/58 (2013.01); H04N 7/0142 (2013.01)

(58) Field of Classification Search
CPC ..... G06T 11/001; G06T 3/4007; G06T 11/60; G06T 5/001; G06T 7/12; G06T 7/181; G06T 2207/20192; G06T 3/403; G06T 7/13; G06T 7/10; G09G 5/02; G09G 2340/0407; H04N 1/409; H04N 1/58; H04N 7/0142; H04N 5/142; H04N 5/208; H04N 1/4092; H04N 9/7976

USPC ....... 345/581, 589, 600, 604, 606, 619, 660; 382/266

See application file for complete search history.

(56) References Cited

U.S. PATENT DOCUMENTS

| | | | |
|---|---|---|---|
| 6,556,311 B1 * | 4/2003 | Benear | G06T 3/403 358/1.9 |
| 9,235,878 B1 * | 1/2016 | Hirsh | G06T 5/003 |
| 2009/0226097 A1 * | 9/2009 | Matsumoto | G06T 3/403 382/199 |
| 2010/0033497 A1 * | 2/2010 | Ueno | G06T 5/002 345/611 |

\* cited by examiner

*Primary Examiner* — Ke Xiao
*Assistant Examiner* — Andrew Shin
(74) *Attorney, Agent, or Firm* — Winston Hsu (57) ABSTRACT

A method for scaling up an image in a display device includes acquiring luminance data and color data of a plurality of pixels in the image; generating high frequency components according to the luminance data of a first pixel and a plurality of second pixels adjacent to the first pixel in each set of adjacent pixels among the plurality of pixels; adjusting the high frequency components corresponding to each set of adjacent pixels, for making a sum of the high frequency components corresponding to each set of adjacent pixels to be within a predetermined range; and transforming the luminance data of the first pixel, the high frequency components and duplicating the color data of the first pixel in each set of adjacent pixels, to generate image data of a plurality of scaling-up points between the first pixel and each of plurality of second pixels in each set of adjacent pixels.

13 Claims, 4 Drawing Sheets

METHOD OF SCALING UP IMAGE

BACKGROUND OF THE INVENTION

1. Field of the Invention

The present invention relates to a method of scaling up an image, and more particularly, to a method of scaling up an image via reconstructing high frequency components according to luminance data of the image and inversely transforming the high frequency components.

2. Description of the Prior Art

A conventional display device (e.g. electronic products with video playback function, such as a smart phone or a smart TV) performs an up-scaling operation on an original image to generate a high resolution image. Typically, when generating a new pixel in the horizontal direction, the conventional display device only utilizes the original pixels at the left and right sides of the new pixel as reference pixels. In such a condition, edges of image contents in the high resolution image would become blurred and the quality of the high resolution image would be downgraded. That is, regarding some image contents of the original image, the high resolution image generated by the conventional display device looks unreal since the original image inherently does not include complete image information required for generating the high resolution image.

In addition, when the conventional display device generates the high resolution image, a problem of generating a great amount of erroneous image information may occur. There are some solutions proposed by the related art in response to this problem, in order to improve the image quality. However, no matter which solution is chosen, a corresponding side effect typically exists. For example, utilizing a complicated algorithm may cause hardware resources to be insufficient. In another example, utilizing a hardware circuit equipped with increased calculation capability may cause the overall cost to be too high. Therefore, a method for improving the quality of the high resolution image is expected.

SUMMARY OF THE INVENTION

In order to solve the above problem, the present invention provides a method of scaling up an image via reconstructing high frequency components among luminance data of the image and inversely transforming the high frequency components.

The present invention discloses a method for scaling up an image in a display device. The method comprises acquiring luminance data and color data of a plurality of pixels in the image; generating a plurality of high frequency components according to the luminance data of a first pixel and a plurality of second pixels adjacent to the first pixel in each set of adjacent pixels among the plurality of pixels; adjusting the plurality of high frequency components corresponding to each set of adjacent pixels, for making a sum of the plurality of high frequency components corresponding to each set of adjacent pixels to be within a predetermined range; and transforming the luminance data of the first pixel and the plurality of high frequency components and duplicating the color data of the first pixel in each set of adjacent pixels, to generate image data of a plurality of scaling-up points between the first pixel and each of plurality of second pixels in each set of adjacent pixels.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
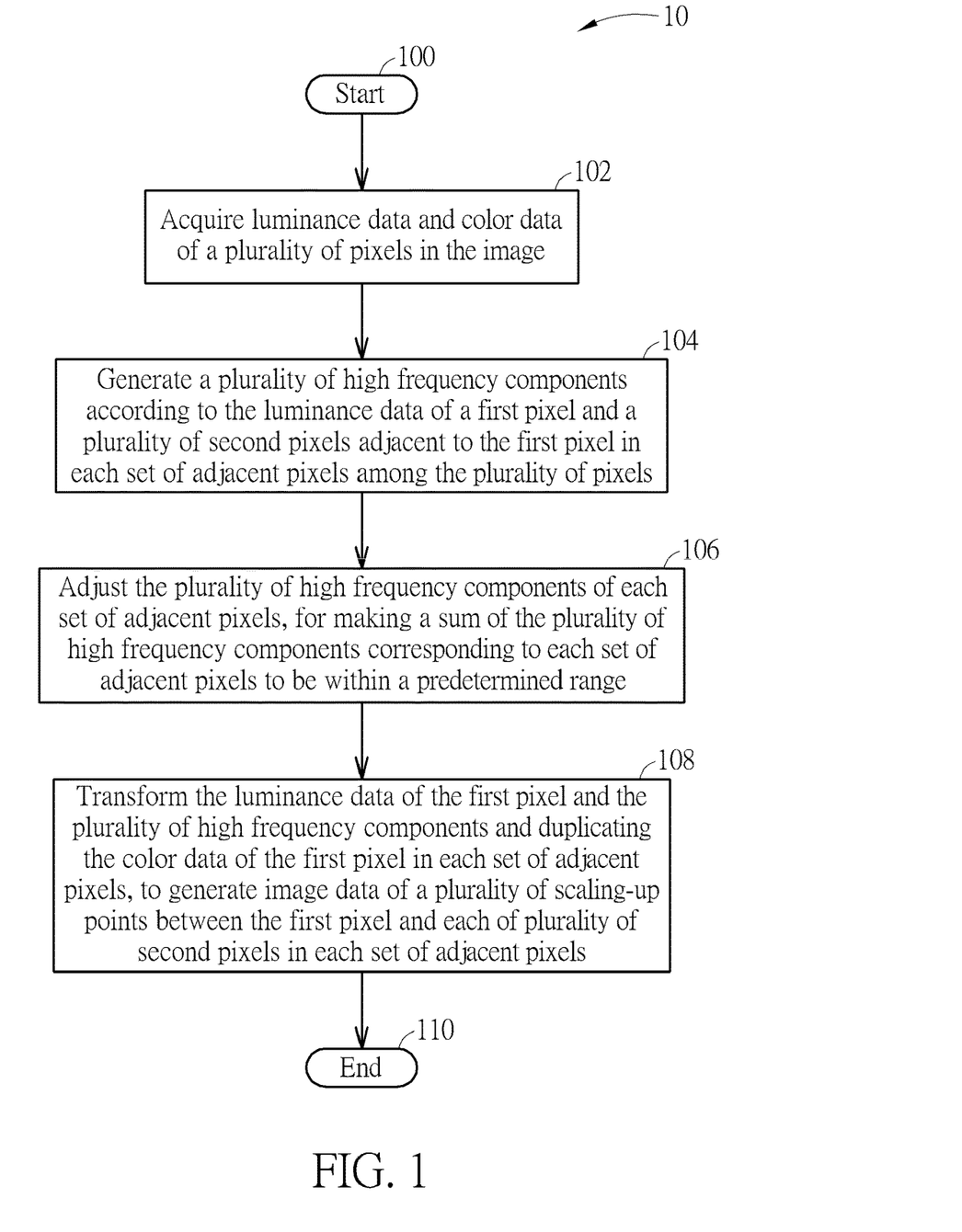
FIG. 1 is a flowchart of a process according to an example of the present invention.

Please refer to FIG. 1, which is a flowchart of a process 20 according to an example of the present invention. The process 20 may be utilized for scaling up an image displayed by a display device. The display device may be an electronic product with an image/video playback function, such as a smart phone, a digital camera, a smart television, a laptop, liquid crystal display or a tablet, and is not limited herein. As shown in FIG. 1, the process 10 comprises the following steps:

Step 100: Start.

Step 102: Acquire luminance data and color data of a plurality of pixels in the image.

Step 104: Generate a plurality of high frequency components according to the luminance data of a first pixel and a plurality of second pixels adjacent to the first pixel in each set of adjacent pixels among the plurality of pixels.

Step 106: Adjust the plurality of high frequency components of each set of adjacent pixels, for making a sum of the plurality of high frequency components corresponding to each set of adjacent pixels to be within a predetermined range.

Step 108: Transform the luminance data of the first pixel and the plurality of high frequency components and duplicating the color data of the first pixel in each set of adjacent pixels, to generate image data of a plurality of scaling-up points between the first pixel and each of plurality of second pixels in each set of adjacent pixels.

Step 110: End.

According to the process 10, the display device first acquires luminance data and color data of a plurality of pixels in the image when being required to scale up the image. For example, the display device may be required to double the size of the image. In other words, the display device needs to generate new pixels between adjacent pixels in the image. The image data of the plurality of pixels may be presented in a Red-Green-Blue (RGB) color space and the display device may be required to transform the image data of the RGB color space to those of a YCbCr space or to those of a YCoCg space for acquiring the luminance data and the color data of the plurality of pixels (step 102). The formulas of the transformation between the RGB color space and the YCbCr/YCoCg space may be appropriately altered according to different concepts and should be well known to those with ordinary skill in the art. Thus, the formulas of the transformation between the RGB color space and the YCbCr/YCoCg space are not narrated herein for brevity.

After acquiring the luminance data of the plurality of pixels in the image, the display device generates (e.g.

reconstructs) a plurality of high frequency components according to the luminance data of a first pixel and a plurality of second pixels adjacent to the first pixel in each set of adjacent pixels among the plurality of pixels, wherein the high frequency components is utilized for generating luminance data of the new pixel between the first pixel and each of the plurality of second pixels in each set of adjacent pixels (step 104). In an example, the first pixel may be any one of the plurality pixels in the image and the plurality of second pixels may comprise the pixel adjacent to the right side of the first pixel, the pixel adjacent to the bottom side of the first pixel and/or the pixel adjacent to the bottom-right side of the first pixel, and is not limited herein. According to different design concepts, the method of generating the plurality high frequency components according to the luminance data of the first pixel and the plurality of second pixels may be various. For example, each of the plurality of high frequency components may be half of the difference between the first pixel and each of the plurality of second pixels, and is not limited herein.

Next, the display device adjusts the plurality of high frequency components to satisfy a constraint of that a sum of the plurality of high frequency components is within a predetermined range (step 106). In an example, the predetermined range equals 0. In another example, the predetermined range comprises 0 (e.g. from −1 to 1). The predetermined range may be modified according to different applications and design concepts, and is not limited herein (step 106). In step 108, the display device generates the luminance data of new pixel between the first pixel and each of the plurality of second pixels in each set of adjacent pixels by inversely transforming the luminance data of the first pixel and the plurality of high frequency components. In addition, the color data (e.g. the data of CoCg/CbCr plane) of the new pixels can be acquired by duplicating the color data of the first pixel. That is, the color data of the new pixels is equal to that of the first pixel. Via the above steps, the display device appropriately generates the image data (i.e. the luminance data and the color data) of the new pixels between the first pixel and each of the plurality of second pixel in each set of adjacent pixels and doubles the number of the pixels in the image. The edges of the contents in the image would not be blurred after the scaling operations and the quality of the up-scale image is effectively improved.

Figure 2:
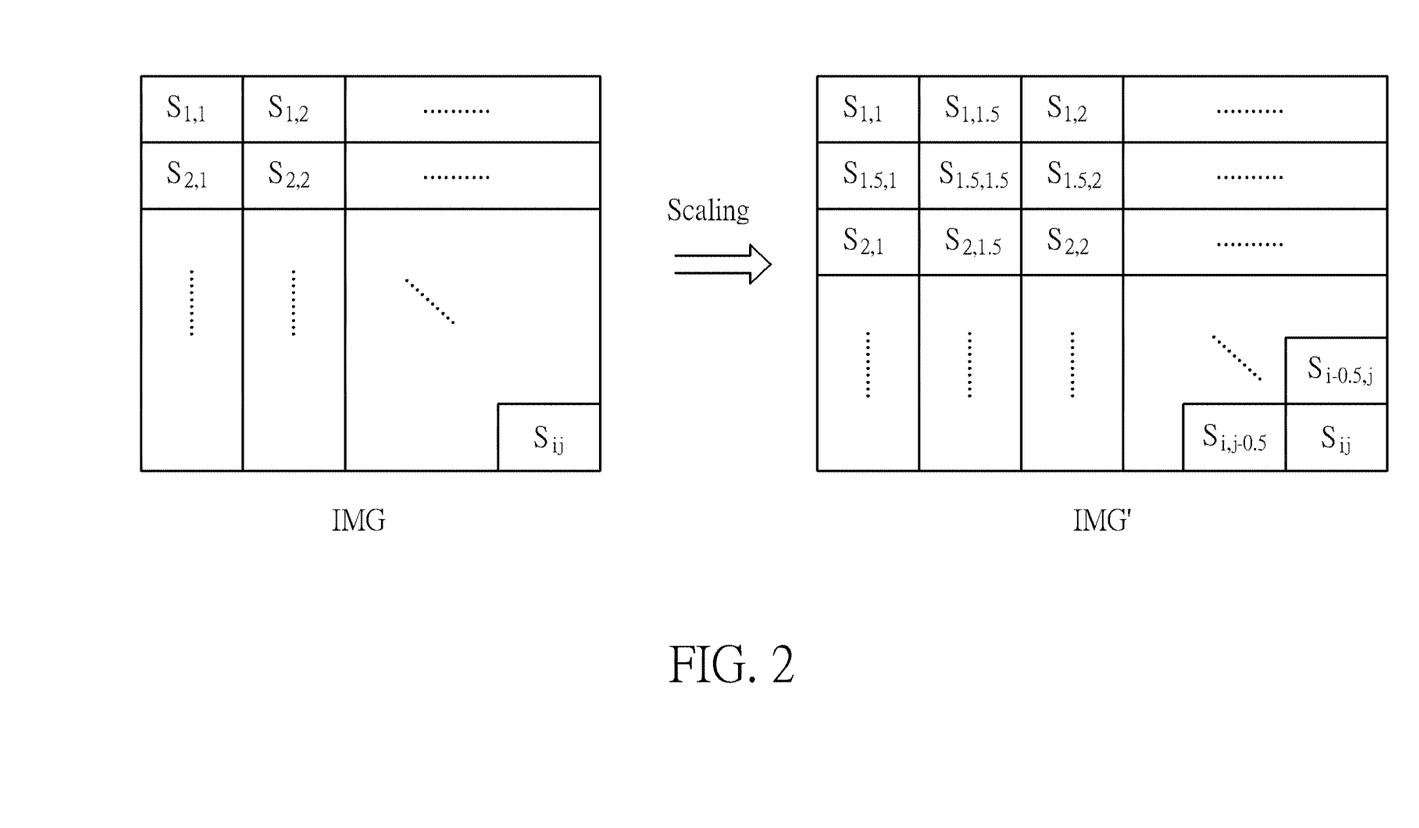
FIG. 2 is a schematic diagram of images according to an example of the present invention.

As to detailed operations of the process 10, please refer to FIG. 2 which is a schematic diagram of images IMG and IMG' according to an example of the present invention. As shown in FIG. 2, the image IMG comprises pixels $S_{1,1}$-$S_{i,j}$ and the display device is required to double the size of the image IMG to generate the image IMG' shown in FIG. 2. Under such a condition, the display device is required to generate new pixels between adjacent pixels in the pixel $S_{1,1}$-$S_{i,j}$. For example, the display device is required to generate a new pixel $S_{1,1.5}$ between the pixels $S_{1,1}$ and $S_{1,2}$, a new pixel $S_{1.5,1}$ between the pixels $S_{1,1}$ and $S_{2,1}$, a new pixel $S_{1.5,1.5}$ between the pixels $S_{1,1}$ and $S_{2,2}$, and so on. When scaling up the image IMG, the display device first acquires luminance data $Y_{1,1}$-$Y_{i,j}$ and color data $CD_{1,1}$-$CD_{i,j}$ of the pixels $S_{1,1}$-$S_{i,j}$. In an example, the display device may need to perform the transformations between RGB color space to YCoCg/YCbCr color space when the image data of the pixels $S_{1,1}$-$S_{i,j}$ is expressed in the RGB color space, so as to acquire the luminance data $Y_{1,1}$-$Y_{i,j}$ and color data $CD_{1,1}$-$CD_{i,j}$ of the pixels $S_{1,1}$-$S_{i,j}$.

Next, the display device reconstructs high frequency components $C_{1.5,1}$, $C_{1,1.5}$, $C_{1.5,1.5}$, . . . , $C_{i-0.5,j}$, and $C_{i,j-0.5}$ according to the luminance data $Y_{1,1-n,j}$. In order to simplify illustrations, the following description takes a set of adjacent pixels comprising the pixel $S_{1,1}$ (i.e. the first pixel) and the pixels $S_{1,2}$, $S_{2,1}$ and $S_{2,2}$ adjacent to the pixel $S_{1,1}$ (i.e. the plurality of second pixels adjacent to the first pixel) as an example. The high frequency components $C_{1.5,1}$, $C_{1,1.5}$ and $C_{1.5,1.5}$ between the pixel $S_{1,1}$ and each of the pixels $S_{1,2}$, $S_{2,1}$ and $S_{2,2}$ may be expressed as the following equations:

$$C_{1.5,1} = \frac{Y_{1,1} - Y_{1,2}}{2} \quad (1)$$

$$C_{1,1.5} = \frac{Y_{1,1} - Y_{2,1}}{2} \quad (2)$$

$$C_{1.5,1.5} = \frac{Y_{1,1} - Y_{2,2}}{2} \quad (3)$$

According to the equations (1)-(3), the high frequency components $C_{1.5,1}$, $C_{1,1.5}$ and $C_{1.5,1.5}$ are half the differences between the pixel $S_{1,1}$ and each of the pixels $S_{1,2}$, $S_{2,1}$ and $S_{2,2}$, respectively, in this example. The equations of generating the high frequency components $C_{1.5,1}$, $C_{1,1.5}$ and $C_{1.5,1.5}$ may be appropriately changed according to different design concepts. For example, the high frequency components $C_{1.5,1}$, $C_{1,1.5}$ and $C_{1.5,1.5}$ may be expressed as the following equations:

$$C_{1.5,1} = \frac{(Y_{1,1} - Y_{1,2}) + (Y_{2,1} - Y_{2,2})}{8} \quad (4)$$

$$C_{1,1.5} = \frac{(Y_{1,1} + Y_{1,2}) - (Y_{2,1} + Y_{2,2})}{8} \quad (5)$$

$$C_{1.5,1.5} = \frac{(Y_{1,1} + Y_{2,2}) - (Y_{1,2} + Y_{2,1})}{8} \quad (6)$$

After acquiring the high frequency components $C_{1.5,1}$, $C_{1,1.5}$ and $C_{1.5,1.5}$, the display device adjusts the high frequency components $C_{1.5,1}$, $C_{1,1.5}$ and $C_{1.5,1.5}$ before the inverse transformation. The inverse transformation equations from the luminance data $Y_{1,1}$, the high frequency components $C_{1.5,1}$, $C_{1,1.5}$ and $C_{1.5,1.5}$ to the luminance data $Y_{1,1}$, $Y_{1,1.5}$, $Y_{1.5,1}$ and $Y_{1.5,1.5}$ may be expressed as:

$$\begin{bmatrix} Y_{1,1} & Y_{1,1.5} \\ Y_{1.5,1} & Y_{1.5,1.5} \end{bmatrix} = \begin{bmatrix} Y_{1,1} + C_{1,1.5} + & (Y_{1,1} + C_{1.5,1}) - \\ C_{1.5,1} + C_{1.5,1.5} & (C_{1,1.5} + C_{1.5,1.5}) \\ (Y_{1,1} - C_{1.5,1}) + & (Y_{1,1} - C_{1.5,1}) - \\ (C_{1,1.5} - C_{1.5,1.5}) & (C_{1,1.5} - C_{1.5,1.5}) \end{bmatrix} \quad (7)$$

As can be seen from the equation (7), a sum SUMC of the high frequency components $C_{1.5,1}$, $C_{1,1.5}$ and $C_{1.5,1.5}$ (i.e. SUMC=$C_{1.5,1}$+$C_{1,1.5}$+$C_{1.5,1.5}$) should be 0 since the luminance data $Y_{1,1}$ should remain the same after the inverse transformation. According to the above concept, the display device adjusts the high frequency components $C_{1.5,1}$, $C_{1,1.5}$ and $C_{1.5,1.5}$ to satisfy the constraint of that the sum SUMC is equal to 0 before the inverse transformation.

The methods of adjusting the high frequency components $C_{1.5,1}$, $C_{1,1.5}$ and $C_{1.5,1.5}$ to satisfy the constraint may be various. In an example, the sum SUMC is equal to one of the high frequency components $C_{1.5,1}$, $C_{1,1.5}$ and $C_{1.5,1.5}$. In such a condition, the display device adjusts each of the high frequency components $C_{1.5,1}$, $C_{1,1.5}$ and $C_{1.5,1.5}$ to be 0. In another example, the high frequency components $C_{1.5,1}$, $C_{1,1.5}$ and $C_{1.5,1.5}$ may have the same sign (i.e. $C_{1.5,1}>0$, $C_{1,1.5}>0$, $C_{1.5,1.5}>0$ or $C_{1.5,1}<0$, $C_{1,1.5}<0$, $C_{1.5,1.5}<0$). The high frequency components $C_{1.5,1}$, $C_{1,1.5}$ and $C_{1.5,1.5}$ are also adjusted to be 0 in this example. In still another example, the sign of only one of the high frequency components $C_{1.5,1}$, $C_{1,1.5}$ and $C_{1.5,1.5}$ equals that of the sum SUMC. Under such a condition, the one of the high frequency components $C_{1.5,1}$, $C_{1,1.5}$ and $C_{1.5,1.5}$ with the same sign of the sum SUMC is subtracted by the sum SUMC.

In an example, there are high frequency components HFC1 and HFC2 of the high frequency components $C_{1.5,1}$, $C_{1,1.5}$ and $C_{1.5,1.5}$ having the same sign of the sum SUMC and an absolute value of the high frequency component HFC1 is greater than that of the high frequency component HFC2. That is, two of the high frequency components $C_{1.5,1}$, $C_{1,1.5}$ and $C_{1.5,1.5}$ are equipped with the same sign of the sum SUMC in this example. If the absolute value of the high frequency component HFC1 is greater than or equal to that of the high frequency component HFC2 after subtracting the sum SUMC (i.e. |HFC1−SUMC|≥|HFC2|), the display device adjusts the high frequency components $C_{1.5,1}$, $C_{1,1.5}$ and $C_{1.5,1.5}$ by subtracting the sum SUMC from the high frequency component HFC1. Further, if both the signs of the high frequency components HFC1 and HFC2 do not change after subtracting half of the sum SUMC (i.e.

$$\left(HFC1 - \frac{SUMC}{2}\right) \times SUMC > 0 \&\& \left(HFC2 - \frac{SUMC}{2}\right) \times SUMC > 0),$$

the display device adjusts the high frequency components $C_{1.5,1}$, $C_{1,1.5}$ and $C_{1.5,1.5}$ by subtracting half of the sum SUMC from the high frequency components HFC1 and HFC2. If the sign of the high frequency component HFC2 changes after subtracting half of the sum SUMC (i.e.

$$\left(HFC2 - \frac{SUMC}{2}\right) \times SUMC < 0),$$

the display device adjusts the high frequency components $C_{1.5,1}$, $C_{1,1.5}$ and $C_{1.5,1.5}$ by adjusting the high frequency component HFC2 to 0 and subtracting a difference between the sum SUMC and the high frequency component HFC2 from the high frequency component HFC1 (i.e. HFC2⇒0, HFC1=HFC1−SUMC (SUMC−HFC2)).

After the display device adjusts the sum of the high frequency components $C_{1.5,1}$, $C_{1,1.5}$ and $C_{1.5,1.5}$ to satisfy the constraint, the display device starts to generate the luminance data $Y_{1,1.5}$, $Y_{1.5,1}$ and $Y_{1.5,1.5}$ according to the equation (7). The color data $CD_{1,1.5}$, $CD_{1.5,1}$ and $CD_{1.5,1.5}$ (e.g. the data of CoCg plane) of the pixels $S_{1,1.5}$, $S_{1.5,1}$ and $S_{1.5,1.5}$ are duplicated from the color data $CD_{1,1}$ of the pixel $S_{1,1}$. Via repeating the above steps, the display device may generate the image data of the new pixels between the adjacent pixels in the image IMG and acquire the image IMG' with the high resolution.

Note that, the constraint on the sum SUMC of the high frequency components corresponding to each set of adjacent pixels (e.g. the high frequency components $C_{1.5,1}$, $C_{1,1.5}$ and $C_{1.5,1.5}$) may be modified to be within a predetermined range PR comprising 0 (e.g. from −1 to 1) after the adjustments, and is not limited herein. When the constraint on the sum SUMC of the high frequency components of each set of adjacent pixels is altered, the conditions of adjusting the high frequency components may be accordingly modified.

The above examples generate the luminance data of the new pixels in the up-scale image by reconstructing the high frequency components and inversely transforming the high frequency components, wherein the sum of the high frequency components in each set of adjacent pixels is adjusted to the predetermined range before being inversely transformed. As a result, the edges of the contents in the up-scale image would not be blurred after the scaling operations and the quality of the up-scale image is effectively improved. According to different applications and design concepts, those with ordinary skill in the art may observe appropriate alternations and modifications.

Figure 3:
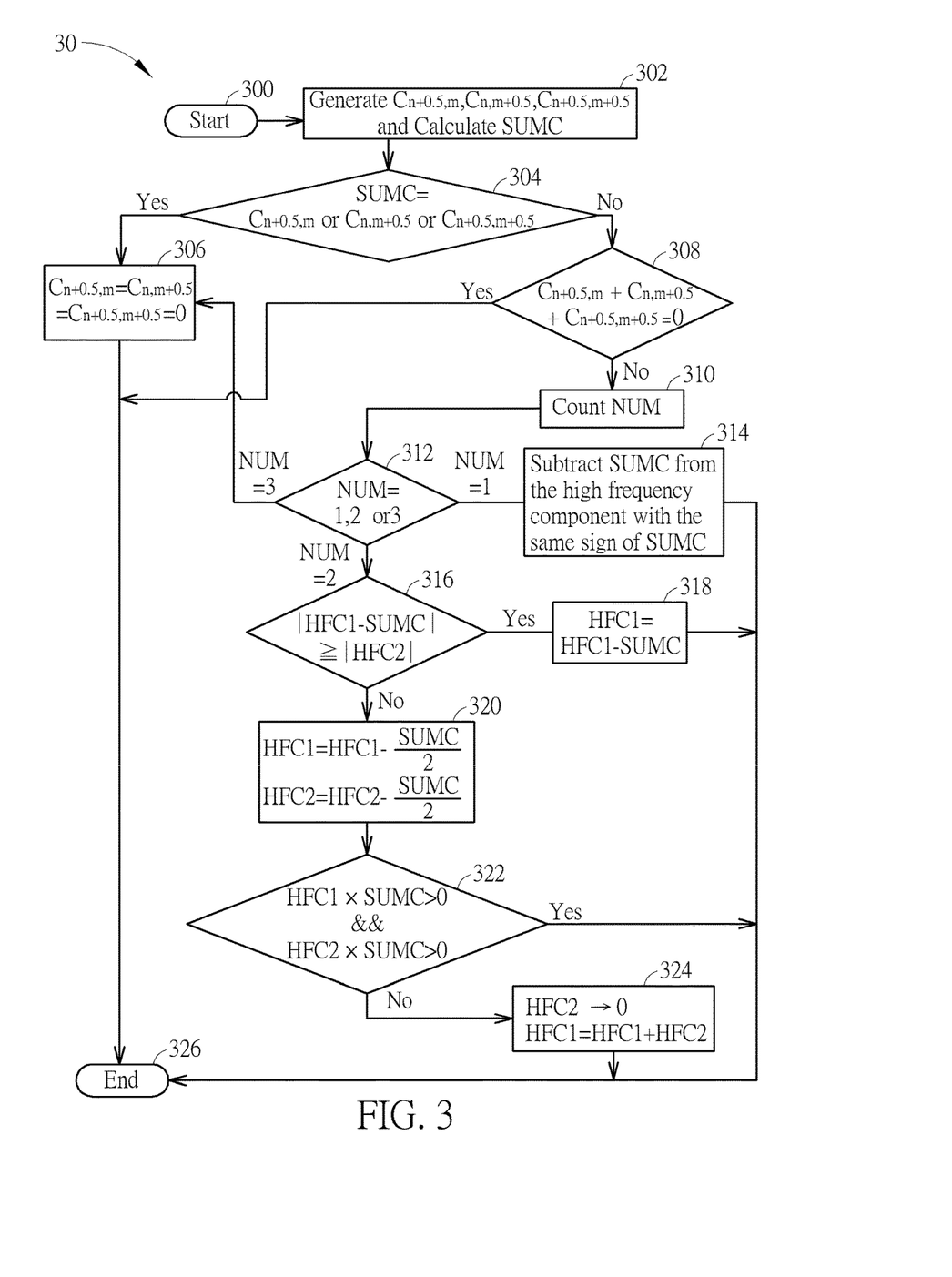
FIG. 3 is a flowchart of a process according to an example of the present invention.

The procedures of the display device generating and adjusting the high frequency components $C_{1.5,1}$, $C_{1,1.5}$ and $C_{1.5,1.5}$ can be summarized into a process 30 as shown in FIG. 3. The process 30 may be utilized for generating, adjusting high frequency components $C_{n+0.5,m}$, $C_{n,m+0.5}$ and $C_{n+0.5,m+0.5}$ generated according to the luminance data $Y_{n,m}$, $Y_{n+1,m}$, $Y_{n,m+1}$, $Y_{n+1,m+1}$ of the pixel $S_{n,m}$ and each of the pixels $S_{n+1,m}$, $S_{n,m+1}$ and $S_{n+1,m+1}$ adjacent to the pixel $S_{n,m}$ in an image and comprise the following steps:

Step 300: Start.

Step 302: Generate the high frequency components $C_{n+0.5,m}/C_{n,m+0.5,m}$, $C_{n,m+0.5}$ and $C_{n+0.5,m+0.5}$ according to luminance data $Y_{n,m}$, $Y_{n+1,m}$, $Y_{n,m+1}$ and $Y_{n+1,m+1}$ of the pixels $S_{n,m}$, $S_{n+1,m}$, $S_{n,m+1}$ and $S_{n+1,m+1}$ and calculate a sum SUMC of the high frequency components $C_{n+0.5,m}$, $C_{n,m+0.5}$ and $C_{n+0.5,m+0.5}$.

Step 304: Determine whether the sum SUMC is equal to one of the high frequency components $C_{n+0.5,m}$, $C_{n,m+0.5}$ and $C_{n+0.5,m+0.5}$. If yes, perform step 306; otherwise, perform step 308.

Step 306: Adjust the high frequency components $C_{n+0.5,m}$, $C_{n,m+0.5}$ and $C_{n+0.5,m+0.5}$ to 0.

Step 308: Determine whether the sum SUMC is equal to 0. If yes, perform step 326; otherwise, perform step 310.

Step 310: Count a number NUM of the high frequency components $C_{n+0.5,m}$, $C_{n,m+0.5}$ and $C_{n+0.5,m+0.5}$ with the same sign of the sum SUMC.

Step 312: Determine whether the number NUM is 1, 2 or 3. If the number NUM is 1 perform step 314; if the number NUM is 2, perform step 316; and if the number NUM is 3, perform step 306.

Step 314: Subtract the sum SUMC from the high frequency component with the same sign of the sum SUMC.

Step 316: Determine whether an absolute value of a high frequency component HFC1 with the same sign of the sum SUMC is greater than or equal to an absolute value of a high frequency component HFC2 with the same sign of the sum SUMC after subtracting by the sum SUMC, wherein the absolute value of the high frequency component HFC1 is greater than or equal to that of the high frequency component HFC2. If yes, perform step 318; otherwise, perform step 320.

Step 318: Subtract the sum SUMC from the high frequency component HFC1.

Step 320: Subtract half of the sum SUMC from the high frequency components HFC1 and HFC2.

Step 322: Determine whether the signs of the high frequency components HFC1 and HFC2 keep the same with that the sum SUMC after subtracting half of the sum SUMC. If yes, perform step 324; otherwise, perform step 326.

Step 324: Adjust the high frequency component HFC2 to 0 and add the components HFC1 and HFC2 as the high frequency component HFC1.

Step 326: End.

According to the process 30, the high frequency components $C_{n+0.5,m}$, $C_{n,m+0.5}$ and $C_{n+0.5,m+0.5}$ corresponding to the new pixels $S_{n+0.5,m}$, $S_{n,m+0.5}$ and $S_{n+0.5,m+0.5}$ are generated and appropriately adjusted. As to detailed operations of the process 30, please refer to the following examples.

In an example, the display device generates −1.875, −8.125 and 1.875 as the high frequency components $C_{n+0.5,m}$, $C_{n,m+0.5}$ and $C_{n+0.5,m+0.5}$, respectively, and calculates the sum SUMC to be equal to −8.125 (step 302). Since the sum SUMC is equal to the high frequency component $C_{n,m+0.5}$, and the display device adjusts the high frequency components $C_{n+0.5,m}$, $C_{n,m+0.5}$ and $C_{n+0.5,m+0.5}$ to 0 (steps 304 and 306).

In an example, the display device generates 4.25, −2.75 and −1.5 as the high frequency components $C_{n+0.5,m}$, $C_{n,m+0.5}$ and $C_{n+0.5,m+0.5}$, respectively, and calculates the sum SUMC to be equal to 0 (step 302). In this example, the sum SUMC is not equal to each of the high frequency components $C_{n+0.5,m}$, $C_{n,m+0.5}$ and $C_{n+0.5,m+0.5}$ and is equal to 0. Thus, the high frequency components $C_{n+0.5,m}$, $C_{n,m+0.5}$ and $C_{n+0.5,m+0.5}$ are not adjusted (steps 304 and 308).

In an example, the display device generates 4.875, −2.375 and −1.625 as the high frequency components $C_{n+0.5,m}$, $C_{n,m+0.5}$ and $C_{n+0.5,m+0.5}$, respectively, and calculates the sum SUMC to be equal to 0.875 (step 302). The display device determines that the sum SUMC is not equal to each of the high frequency components $C_{n+0.5,m}$, $C_{n,m+0.5}$ and $C_{n+0.5,m+0.5}$ and is not 0 (steps 304 and 308). In this example, only the high frequency component $C_{n+0.5,m}$ has the same sign of the sum SUMC (i.e. the number NUM is 1), thus the display device subtracts the sum SUMC from the high frequency component $C_{n+0.5,m}$ and the high frequency component $C_{n+0.5,m}$ is adjusted to 4 (steps 310, 312 and 314).

In an example, the high frequency components $C_{n+0.5,m}$, $C_{n,m+0.5}$ and $C_{n+0.5,m+0.5}$ are −7.875, −0.625, and 1.875 and the sum SUMC is −6.625 (step 302). The display device determines that the sum SUMC is not equal to each of the high frequency components $C_{n+0.5,m}$, $C_{n,m+0.5}$ and $C_{n+0.5,m+0.5}$ and is not 0 (steps 304 and 308). Next, the display device counts and acknowledges that the number NUM of the high frequency components $C_{n+0.5,m}$, $C_{n,m+0.5}$ and $C_{n+0.5,m+0.5}$ with the same sign of the sum SUMC is 2 (step 310). In this example, the high frequency component HFC1 is the high frequency component $C_{n+0.5,m}$ and the high frequency component HFC2 is the high frequency component $C_{n,m+0.5}$. Since the absolute value of the high frequency component HFC1 is greater than that of the high frequency component HFC2 after being subtracted by the sum SUMC (i.e. |−7.875−(−6.625)|=1.25>|−0.625|), the display device subtracts the sum SUMC from the high frequency component HFC1 (i.e. the high frequency component $C_{n+0.5,m}$) and the high frequency component HFC1 becomes 1.25 (steps 312 and 316).

In an example, the high frequency components $C_{n+0.5,m}$, $C_{n,m+0.5}$ and $C_{n+0.5,m+0.5}$ are −8, 9.75, and −7.5 and the sum SUMC is −5.75 (step 302). The display device determines that the sum SUMC is not equal to each of the high frequency components $C_{n+0.5,m}$, $C_{n,m+0.5}$ and $C_{n+0.5,m+0.5}$ and is not 0 (steps 304 and 308). Next, the display device counts and acknowledges that the number NUM of the high frequency components $C_{n+0.5,m}$, $C_{n,m+0.5}$ and $C_{n+0.5,m+0.5}$ with the same sign of the sum SUMC is 2 (step 310). In this example, the high frequency component HFC1 is the high frequency component $C_{n+0.5,m}$ and the high frequency component HFC2 is the high frequency component $C_{n+0.5,m+0.5}$. Since the absolute value of the high frequency component HFC1 is smaller than that of the high frequency component HFC2 after being subtracted by the sum SUMC (i.e. |−8−(−5.75)|=2.25<|−7.5|), the display device subtracts half of the sum SUMC from the high frequency components HFC1 and HFC2 (i.e. the high frequency components $C_{n+0.5,m}$ and $C_{n+0.5,m+0.5}$) and the high frequency components HFC1 and HFC2 become −5.125 and −4.625, respectively (steps 312, 316 and 320). The signs of both the high frequency components HFC1 and HFC2 remain the same with that of the sum SUMC, such that the high frequency components HFC1 and HFC2 do not need further adjustments (step 322).

In an example, the high frequency components $C_{n+0.5,m}$, $C_{n,m+0.5}$ and $C_{n+0.5,m+0.5}$ are −3.375, −15.125, and 1.375 and the sum SUMC is −17.125 (step 302). The display device determines that the sum SUMC is not equal to each of the high frequency components $C_{n+0.5,m}$, $C_{n,m+0.5}$ and $C_{n+0.5,m+0.5}$ and is not 0 (steps 304 and 308). Next, the display device counts and acknowledges that the number NUM of the high frequency components $C_{n+0.5,m}$, $C_{n,m+0.5}$ and $C_{n+0.5,m+0.5}$ with the same sign of the sum SUMC is 2 (step 310). In this example, the high frequency component HFC1 is the high frequency component $C_{n,m+0.5}$ and the high frequency component HFC2 is the high frequency component $C_{n+0.5,m}$. Since the absolute value of the high frequency component HFC1 is smaller than that of the high frequency component HFC2 after being subtracted by the sum SUMC (i.e. |−15.125−(−17.125)|=2<|−3.375|), the display device subtracts half of the sum SUMC from the high frequency components HFC1 and HFC2 (i.e. the high frequency components $C_{n+0.5,m}$ and $C_{n+0.5,m+0.5}$) and the high frequency components HFC1 and HFC2 become −6.5625 and 5.1875, respectively (steps 312, 316 and 320). In this example, the sign of the high frequency component HFC2 (i.e. the high frequency component $C_{n+0.5,m}$) changes, thus the high frequency component HFC2 is adjusted to 0 and the high frequency component HFC1 becomes a sum of the high frequency components HFC1 and HFC2 (steps 322 and 324). Note that, the high frequency component HFC1 is subtracted by half of the sum SUMC and added the high frequency component HFC2, which had been subtracted by half of the sum SUMC. That is, the high frequency component HFC1 can be expressed as the following equation:

$$HFC1 = \qquad\qquad\qquad\qquad\qquad\qquad\qquad (8)$$
$$HFC1 - \frac{SUMC}{2} + \left(HFC2 - \frac{SUMC}{2}\right) = HFC1 - (SUMC - HFC2)$$

According to the equation (8), the display device subtracts the difference between the sum SUMC and the high frequency component HFC2 from the high frequency component HFC1 when the sign of the high frequency component HFC2 is different from that of the sum SUMC after subtracting half of the sum SUMC from the high frequency component HFC2.

In an example, the high frequency components $C_{n+0.5,m}$, $C_{n,m+0.5}$ and $C_{n+0.5,m+0.5}$ are −2.375, −10.125, and −2.375 and the sum SUMC is −14.875 (step 302). The display device determines that the sum SUMC is not equal to each of the high frequency components $C_{n+0.5,m}$, $C_{n,m+0.5}$ and $C_{n+0.5,m+0.5}$ and is not 0 (steps 304 and 308). Next, the display device counts and acknowledges that the number NUM of the high frequency components $C_{n+0.5,m}$, $C_{n,m+0.5}$ and $C_{n+0.5,m+0.5}$ with the same sign of the sum SUMC is 3 (step 310). Thus, the display device adjusts the high frequency components $C_{n+0.5,m}$, $C_{n,m+0.5}$ and $C_{n+0.5,m+0.5}$ to 0 (steps 312 and 306).

Figure 4:
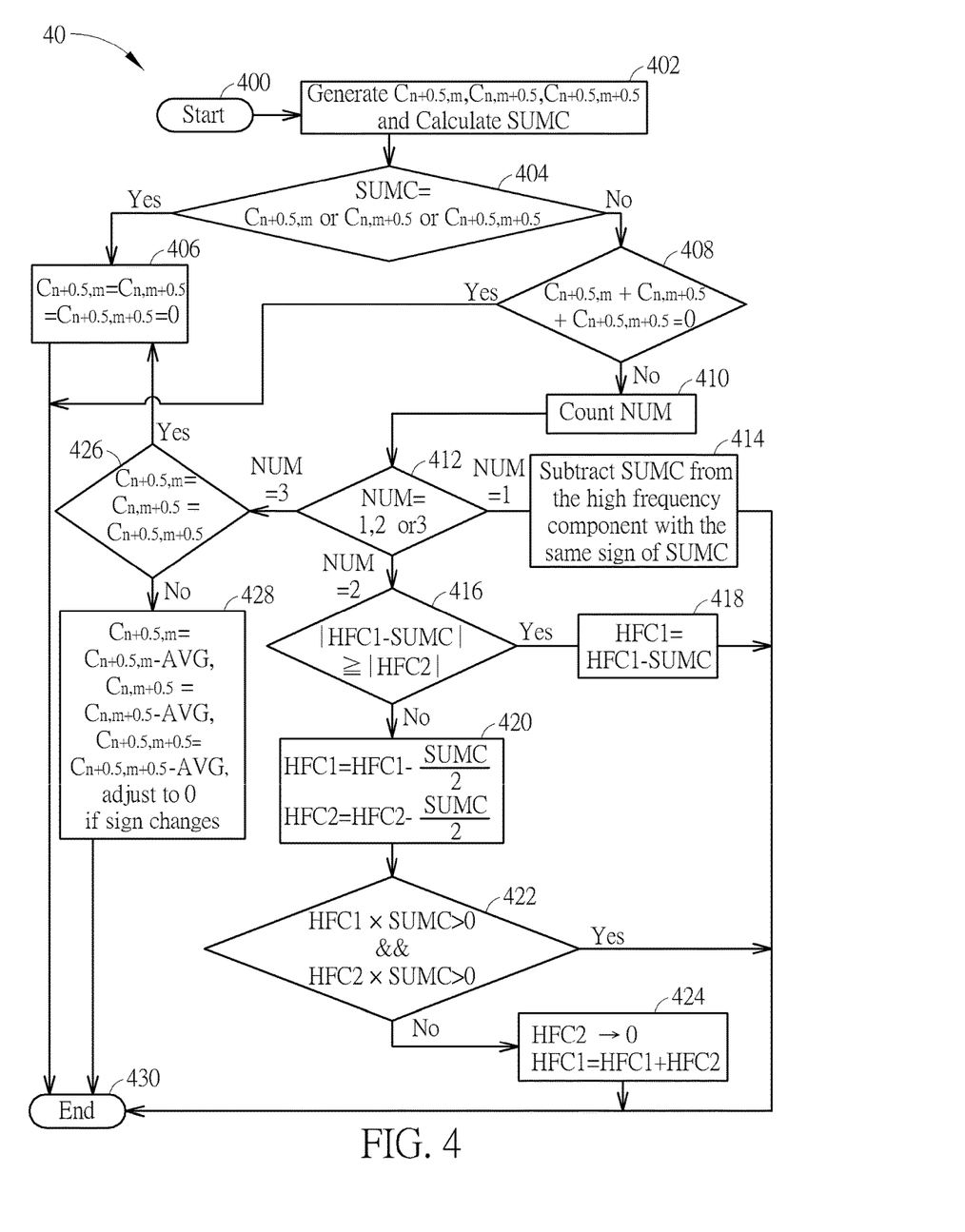
FIG. 4 is a flowchart of a process according to an example of the present invention.

According to different design concepts, the process 30 may be appropriately modified. Please refer to FIG. 4, which is a flow chart of a process 40 according to an example of the present invention. The process 40 can be utilized for generating, adjusting high frequency components $C_{n+0.5,m}$, $C_{n,m+0.5}$ and $C_{n+0.5,m+0.5}$ generated according to the luminance data $Y_{n,m}$, $Y_{n+1,m}$, $Y_{n,m+1}$, $Y_{n+1,m+1}$ of the pixel $S_{n,m}$ and each of the pixels $S_{n+1,m}$, $S_{n,m+1}$ and $S_{n+1,m+1}$ adjacent to the pixel $S_{n,m}$ in an image and comprise the following steps:

Step 400: Start.

Step 402: Generate the high frequency components $C_{n+0.5,m}$, $C_{n,m+0.5}$ and $C_{n+0.5,m+0.5}$ according to luminance data $Y_{n,m}$, $Y_{n+1,m}$, $Y_{n,m+1}$ and $Y_{n+1,m+1}$ of the pixels $S_{n,m}$, $S_{n+1,m}$, $S_{n,m+1}$ and $S_{n+1,m+1}$ and calculate a sum SUMC of the high frequency components $C_{n+0.5,m}$, $C_{n,m+0.5}$ and $C_{n+0.5,m+0.5}$.

Step 404: Determine whether the sum SUMC is equal to one of the high frequency components $C_{n+0.5,m}$, $C_{n,m+0.5}$ and $C_{n+0.5,m+0.5}$. If yes, perform step 406; otherwise, perform step 408.

Step 406: Adjust the high frequency components $C_{n+0.5,m}$, $C_{n,m+0.5}$ and $C_{n+0.5,m+0.5}$ to 0.

Step 408: Determine whether the sum SUMC is equal to 0. If yes, perform step 426; otherwise, perform step 410.

Step 410: Count a number NUM of the high frequency components $C_{n+0.5,m}$, $C_{n,m+0.5}$ and $C_{n+0.5,m+0.5}$ with the same sign of the sum SUMC.

Step 412: Determine whether the number NUM is 1, 2 or 3. If the number NUM is 1 perform step 414; if the number NUM is 2, perform step 416; and if the number NUM is 3, perform step 426.

Step 414: Subtract the sum SUMC from the high frequency component with the same sign of the sum SUMC.

Step 416: Determine whether an absolute value of a high frequency component HFC1 with the same sign of the sum SUMC is greater than or equaled to an absolute value of a high frequency component HFC2 with the same sign of the sum SUMC after subtracting by the sum SUMC, wherein the absolute value of the high frequency component HFC1 is greater than or equal to that of the high frequency component HFC2. If yes, perform step 418; otherwise, perform step 420.

Step 418: Subtract the sum SUMC from the high frequency component HFC1.

Step 420: Subtract half of the sum SUMC from the high frequency components HFC1 and HFC2.

Step 422: Determine whether the signs of the high frequency components HFC1 and HFC2 keep the same with that the sum SUMC after subtracting half of the sum SUMC. If yes, perform step 424; otherwise, perform step 428.

Step 424: Adjust the high frequency component HFC2 to 0 and add the components HFC1 and HFC2 as the high frequency component HFC1.

Step 426: Determine whether the high frequency components $C_{n+0.5,m}$, $C_{n,m+0.5}$ and $C_{n+0.5,m+0.5}$ are the same, if yes, perform step 406; otherwise, perform step 428.

Step 428: Divide the sum SUMC by the number NUM, to acquire an average AVG, subtract the average from each of the high frequency components $C_{n+0.5,m}$, $C_{n,m+0.5}$ and $C_{n+0.5,m+0.5}$, and adjust the high frequency component with the sign different from the sign of the sum to 0.

Step 430: End.

According to the process 40, the high frequency components $C_{n+0.5,m}$, $C_{n,m+0.5}$ and $C_{n+0.5,m+0.5}$ corresponding to the new pixels $S_{n+0.5,m}$, $S_{n,m+0.5}$ and $S_{n+0.5,m+0.5}$ are generated and appropriately adjusted. The steps 402-424 are similar to the steps 302-324 of the process 30. Thus, the detailed operations of steps 402-424 can be referred to the above and are not narrated herein for brevity.

Different from the process 30, the display device determines whether the high frequency components $C_{n+0.5,m}$, $C_{n,m+0.5}$ and $C_{n+0.5,m+0.5}$ are the same when the number NUM is 3 (step 426). If the high frequency components $C_{n+0.5,m}$, $C_{n,m+0.5}$ and $C_{n+0.5,m+0.5}$ are the same, the display device adjusts the high frequency components $C_{n+0.5,m}$, $C_{n,m+0.5}$ and $C_{n+0.5,m+0.5}$ to 0 (step 406); and if the high frequency components $C_{n+0.5,m}$, $C_{n,m+0.5}$ and $C_{n+0.5,m+0.5}$ are different, the display device divides the sum SUMC by 3 (i.e. the number NUM) to acquire an average AVG and subtracts the average AVG from each of the high frequency components $C_{n+0.5,m}$, $C_{n,m+0.5}$ and $C_{n+0.5,m+0.5}$ Note that, the high frequency component with the sign different from the sum SUMC after being subtracted by the average AVG is required to be adjusted to 0 (step 428).

In an example, the high frequency components $C_{n+0.5,m}$, $C_{n,m+0.5}$ and $C_{n+0.5,m+0.5}$ are $-2.375$, $-10.125$, and $-2.375$ and the sum SUMC is $-14.875$. As can be seen from the above description, the high frequency components $C_{n+0.5,m}$, $C_{n,m+0.5}$ and $C_{n+0.5,m+0.5}$ are adjusted to 0 according to the process 30. In comparison, the display device determines the high frequency components $C_{n+0.5,m}$, $C_{n,m+0.5}$ and $C_{n+0.5,m+0.5}$ are different and subtracts the average AVG of the high frequency components $C_{n+0.5,m}$, $C_{n,m+0.5}$ and $C_{n+0.5,m+0.5}$ from each of the high frequency components $C_{n+0.5,m}$, $C_{n,m+0.5}$ and $C_{n+0.5,m+0.5}$ according to the process 40. In such a condition, the high frequency components $C_{n+0.5,m}$, $C_{n,m+0.5}$ and $C_{n+0.5,m+0.5}$ become 2.583, $-5.167$ and 2.583, respectively. Since the signs of the high frequency component $C_{n+0.5,m}$ is different from the sign of the sum SUMC after being subtracted by the average AVG, the high frequency component $C_{n+0.5,m}$ is adjusted to 0. Similarly, the high frequency component $C_{n+0.5,m+0.5}$ is also adjusted to 0 since the sign of the high frequency component $C_{n+0.5,m+0.5}$ changes after being subtracted by the average AVG (steps 426 and 428). In the end, the high frequency components $C_{n+0.5,m}$, $C_{n,m+0.5}$ and $C_{n+0.5,m+0.5}$ are 0, $-5.167$ and 0, respectively.

Please note that, the above mentioned steps of the processes including suggested steps can be realized by means that could be hardware, firmware known as a combination of a hardware device and computer instructions and data that reside as read-only software on the hardware device, or an electronic system. Examples of hardware can include analog, digital and mixed circuits such as microcircuits, microchips, or silicon chips. Examples of the electronic system can include system on chip (SOC), system in package (Sip), computer on module (COM), and the display device.

To sum up, the above examples of the present invention generate the luminance data of the new pixels in the up-scale image via reconstructing and inversely transforming the high frequency components, wherein the high frequency components in each set of adjacent pixels are adjusted to be within the predetermined range. As a result, the edges of the contents in the up-scale image would be sharp after the scaling operations and the quality of the up-scale image is effectively improved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for scaling up an image in a display device, the method comprising:

acquiring luminance data and color data of a plurality of pixels in the image;

calculating a plurality of high frequency components using the luminance data of a first pixel and a plurality of second pixels adjacent to the first pixel in each set of adjacent pixels among the plurality of pixels;

after the calculating step, adjusting the plurality of high frequency components corresponding to each set of adjacent pixels to obtain a plurality of adjusted high frequency components, such that the adjusted high frequency components corresponding to each set of adjacent pixels are modified to let a sum of the adjusted high frequency components to be within a predetermined range after the modification of the adjusted high frequency components is accomplished; and after the adjusting step, generating luminance data of a plurality of scaling-up points between the first pixel and each of the plurality of second pixels in each set of adjacent pixels by transforming the luminance data of the first pixel and the adjusted high frequency components and generating color data of the plurality of scaling-up points between the first pixel by duplicating the color data of the first pixel in each set of adjacent pixels.

2. The method of claim 1, wherein the predetermined range comprises 0.

3. The method of claim 1, wherein the step of adjusting the plurality of high frequency components corresponding to each set of adjacent pixels comprises:
adjusting the plurality of high frequency components to 0 when a difference between the sum of the plurality of high frequency components and one of the plurality high frequency component is within the predetermined range.

4. The method of claim 1, wherein the step of adjusting the plurality of high frequency components corresponding to each set of adjacent pixels comprises:
counting a number of the high frequency components with the same sign of the sum of the plurality of high frequency components; and
adjusting the high frequency components with the same sign of the sum according to the number of the high frequency components with the same sign of the sum.

5. The method of claim 4, wherein the step of adjusting the high frequency components with the same sign of the sum according to the number of the high frequency components with the same sign of the sum comprises:
subtracting the sum from the high frequency component with the same sign of the sum when the number of the high frequency components is 1.

6. The method of claim 4, wherein the step of adjusting the high frequency components with the same sign of the sum according to the number of the high frequency components with the same sign of the sum comprises:
subtracting the sum from a first high frequency component with the same sign of the sum when the number of the high frequency components is 2 and the absolute value of the first high frequency component is greater than or equal to a second high frequency component with the same sign of the sum after subtracting the sum from the first high frequency component.

7. The method of claim 4, wherein the step of adjusting the high frequency components with the same sign of the sum according to the number of the high frequency components with the same sign of the sum comprises:
subtracting half of the sum from each high frequency component with the same sign of the sum when the number of the high frequency components equals 2 and the sign of each high frequency component with the same sign of the sum remains the same with the sign of the sum after being subtracted by half of the sum.

8. The method of claim 4, wherein the step of adjusting the high frequency components with the same sign of the sum according to the number of the high frequency components with the same sign of the sum comprises:
adjusting a first high frequency component with the same sign of the sum to 0 and subtracting a difference between the sum and the first high frequency component from a second high frequency component with the same sign when the number of the high frequency components is 2, the absolute value of the first high frequency component is smaller than the second high frequency component and the sign of the first high frequency component changes if subtracting half of the sum from the first high frequency component.

9. The method of claim 4, wherein the step of adjusting the high frequency components with the same sign of the sum according to the number of the high frequency components with the same sign of the sum comprises:
adjusting the plurality of high frequency components to 0 when the number of the high frequency components with the same sign of the sum is 3.

10. The method of claim 4, wherein the step of adjusting the high frequency components with the same sign of the sum according to the number of the high frequency components with the same sign of the sum comprises:
determining whether the plurality of high frequency components are the same when the number of the high frequency components with the same sign of the sum is 3.

11. The method of claim 10, further comprising:
adjusting the plurality of high frequency components to 0 when the plurality of high frequency components are the same.

12. The method of claim 10, further comprising:
dividing the sum by the number of the high frequency components with the same sign of the sum when the plurality of high frequency components are the different, to acquire an average;
subtracting the average from each of the plurality of high frequency components; and
adjusting the high frequency component with the sign different from the sign of the sum to 0.

13. A method for scaling up an image in a display device, the method comprising:
acquiring luminance data of a plurality of pixels in the image;
calculating a plurality of high frequency components using the luminance data among the plurality of pixels;
after the calculating step, adjusting the plurality of high frequency components to obtain a plurality of adjusted high frequency components, such that the adjusted high frequency components are modified to meet a predetermined condition, wherein the predetermined condition comprises that a sum of the adjusted high frequency components is within a predetermined range; and
after the adjusting step, generating luminance data of a scaling-up point by transforming the luminance data of the pixels according to the adjusted high frequency components.

* * * * *